Patented Aug. 4, 1936

2,049,432

UNITED STATES PATENT OFFICE 2,049,432

COLORING OF MATERIALS MADE WITH OR CONTAINING CELLULOSE DERIVATIVES

George Holland Ellis, Henry Charles Olpin, and Ernest William Kirk, Spondon, near Derby, England, assignors to Celanese Corporation of America, a corporation of Delaware No Drawing. Application June 22, 1928, Serial No. 287,643. In Great Britain July 19, 1927

9 Claims. (Cl. 8—5)

This invention relates to the dyeing, printing, stencilling or otherwise coloring of threads, yarns, knitted or woven fabrics, or other products made with or containing cellulose acetate or other organic acid esters of cellulose, such for example as cellulose formate, propionate, or butyrate, or the products obtained by the treatment of alkalized cellulose with esterifying agent (e. g. the product known as "immunized cotton" obtained by treatment with p-toluene sulpho-chloride), or made of or containing cellulose ethers, such for example as methyl, ethyl, or benzyl cellulose, or the corresponding condensation products of cellulose and glycols or other polyhydric alcohols, all of which cellulose derivatives are hereinafter referred to as organic substitution derivatives of cellulose.

According to the present invention materials made of or containing cellulose acetate or other of the aforesaid organic substitution derivatives of cellulose are dyed or otherwise colored with azo coloring matters in the production of which an aminonaphthol is employed as a component. The term component is used to include the coupling component and the component which is diazotized and coupled therewith. The aminonaphthols employed may or may not be substituted in the nucleus.

The coloring matters for use according to the present invention may be of any desired series. Thus for example monoazo dyestuffs may be obtained by coupling a suitable diazo body of the benzene or naphthalene series with an aminonaphthol in acid or alkaline solution or by diazotizing an aminonaphthol and coupling with an end component for example of the benzene or naphthalene series or with the same or a different aminonaphthol (in acid or alkaline solution) and such dyestuffs may if desired be subsequently diazotized on the fibre and developed with a suitable developer.

Disazo dyestuffs may be obtained by tetrazotizing a suitable diamine, for example benzidine, tolidine, dianisidine, diaminostilbene, diaminodiphenylmethane and the like, and coupling with two molecules of an aminonaphthol or with one molecule of an aminonaphthol and a further molecule of another aminonaphthol or of another suitable end component for example of the benzene or naphthalene series. Primary disazo dyestuffs may be obtained for use according to the present invention by coupling one molecular proportion of a suitable diazotized amine with an aminonaphthol in acid solution and then rendering the solution alkaline and coupling with a further molecular proportion of the same or different diazotized amine or if desired the first coupling may be in acid and the second in alkaline solution. Secondary disazo dyestuffs may be obtained for example by diazotizing a suitable aminoazo compound such for example as benzene-azo-α-naphthyl-amine or aminoazobenzene or their nuclear substitution derivatives or by diazotizing one amino group of a diaminoazo compound, e. g., p,p'-diaminoazobenzene or 4-amino-benzene-1-azo-4-aminonaphthalene and coupling the resulting diazo compound with an aminonaphthol or by diazotizing a suitable amine, coupling with an aminonaphthol and diazotizing the resulting compound and coupling with the same or different aminonaphthol or other suitable coupling component. The disazo dyestuffs when containing diazotizable amino group may be diazotized on the material and developed.

The above examples of the methods of forming the dyestuffs and of the different series of dyestuffs which may be used according to the present invention are intended to be illustrative and not to limit the invention.

Where nitroamines, such as p-nitraniline, or monoacidyl diamines such as p-aminoacetanilide or p-aminophenyloxamic acid have been used in the preparation of the dyestuffs, the nitro or acidyl amino groups may be reduced or hydrolyzed as the case may be, the resulting compounds being particularly useful for diazotization and development on the fibre.

Many of the dyestuffs and particularly those containing only one azo grouping attached to the naphthalene nucleus of the aminonaphthol may be developed on the fibre with a suitable diazo body.

We have found that the dyestuffs containing the azo group linked to the naphthalene nucleus in a position ortho or peri to an auxochrome group and especially those obtained from 1-amino-8-naphthol and its nuclear substituted derivatives by coupling in the ortho position to the auxochrome groups give particularly useful colorings.

The dyestuffs, if soluble or fairly soluble in neutral, slightly alkaline or slightly acid solution, may be applied directly from such an aqueous medium with or without the addition of a dispersing agent, or if insoluble or only slightly soluble in water they may be applied from dispersions in water obtained by any of the methods known in the colloid arts, for example by pretreatment of the dyestuffs with solubilizing agents as described in prior U. S. Patents Nos. 1,618,413

1,618,414, 1,690,481 and 1,694,413 and U. S. applications S. Nos. 152,517 filed December 3, 1926, 134,138 filed September 7, 1926 and 176,289 filed March 17, 1927.

The following are a number of examples of the dyestuffs which may be applied according to the present invention:—

Aniline→1-amino-8-naphthol _____ Red
    (coupled alkaline)
p-Xylidine→2-amino-3-naphthol _____ Red
    (acid)
p-Nitraniline———→1-amino-8-naphthol
    (alk.)
←———aniline _____ _____ Blue
    (alk.)
Dianisidine———→1-amino-8-naphthol
  (2 mols.) _____ Bluish-grey
    (acid)
Dianisidine———→1-amino-8-naphthol
  (2 mols.) _____ Dark brown
p-Aminobenzene-azo-1-amino-8-naphthol (coupled alkaline) _____ Puce The process of the invention may be applied to the dyeing or otherwise coloring of mixed goods comprising for example, in addition to cellulose acetate or other organic substitution derivative of cellulose, silk, wool or cotton or other cellulosic fibre, natural or artificial, in solid or differential shades according to the affinity of the dyestuffs for the fibres used in association.

The following examples illustrate the invention, it being understood that they are not intended to limit it.

*Example 1.*—To dye 10 kilograms of cellulose acetate fabric a red shade.

100 grams of the dyestuff benzene-azo-1-amino-8-naphthol are reduced to a fine powder and stirred into 600 grams of 50% sodium sulphoric-inoleate. The resulting mixture is heated to 90–95° C. and stirred till as homogeneous as possible. It is now diluted with 5 litres of boiling soft water, stirred well, and passed through a filter cloth into a dyebath containing 300 litres soft water, in which have been dissolved 50 grams Marseilles soap. The fabric is entered, and dyeing carried out by raising the temperature to 75–80° C. during ¾ hour, maintaining at this temperature till exhausted. The fabric, which is now dyed a full red shade, is rinsed, and dried or otherwise treated as desired.

*Example 2.*—To dye a black shade on 10 kilos of cellulose acetate yarn in hank form.

200 grams of the dyestuff p-aminobenzeneazo-1-amino-8-naphthol (prepared by coupling diazotized p-nitraniline with 1-amino-8-naphthol in alkaline solution) are treated with 600 grams of the dispersing agent prepared according to Example A of previous U. S. Patent 1,694,413. The dyebath is made up, and dyeing carried through precisely as in Example 1 above. The hanks are then lifted, rinsed, and entered into a bath of 150 litres of water in which are dissolved 500 grams of sodium nitrite and 1½ litres hydrochloric acid 32° Tw. After working in this bath for ½ hr. the goods are lifted, rinsed, and entered into a coupling bath of β.hydroxynaphthoic acid prepared as follows:—

|  | Percent on wt. of goods |
|---|---|
| Betahydroxynaphthoic acid | 3 |
| Caustic soda | 0.7 |
| Glue | 5 |

A 30:1 bath is prepared with the above at 35° C. and 5% acetic acid added immediately before entering the goods. Coupling commences immediately and the bath is slowly raised to 60° C. and maintained at this temperature till complete. The goods are now lightly soaped, and dried or otherwise treated as desired.

*Example 3.*—To dye 10 kilos of cellulose acetate fabric a dark brown shade.

100 grams of the dyestuff prepared from (1 molecule) tetrazotized dianisidine and (2 molecules) 1 amino-8-naphthol by coupling in alkaline solution, are applied to the fibre by the method detailed in Example 1, or by other suitable method, and the goods after rinsing, entered into a bath of a ¼% solution of p-nitrobenzene-diazonium acetate at normal temperature, worked for ½ hr., lifted, rinsed, and dried or otherwise treated as desired.

Instead of the cellulose acetate materials treated in the above examples, materials made of or containing other organic substitution derivatives of cellulose, for example, cellulose formate, cellulose propionate, methyl cellulose, ethyl cellulose, "immunized cotton" etc., may be similarly colored and instead of dyestuffs derived from 1.8-aminonaphthol dyes derived from other aminonaphthols may be employed.

The term dyeing in the appended claims is to be understood to include printing, stencilling or otherwise coloring.

What we claim and desire to secure by Letters Patent is:—

1. Process of dyeing materials comprising organic substitution derivatives of cellulose characterized in that said materials are colored by means of an unsulfonated azo dye in the production of which an aminonaphthol is employed as a component.

2. Process of dyeing materials comprising organic substitution derivatives of cellulose characterized in that said materials are colored by means of an unsulfonated azo dye in the production of which an aminonaphthol is employed as a component and which contains azo group in the ortho position to an auxochrome group of the naphthalene nucleus.

3. Process of dyeing materials comprising organic substitution derivatives of cellulose characterized in that said materials are colored by means of an unsulfonated azo dye in the production of which a 1.8 aminonaphthol is employed as a component.

4. Process of dyeing materials comprising cellulose acetate characterized in that said materials are colored by means of an unsulfonated azo dye in the production of which an aminonaphthol is employed as a component.

5. Process of dyeing materials comprising cellulose acetate characterized in that said materials are colored by means of an unsulfonated azo dye in the production of which an aminonaphthol is employed as a component and which contains the azo group in the ortho position to an auxochrome group of the naphthalene nucleus.

6. Process of dyeing materials comprising cellulose acetate characterized in that said materials are colored by means of an unsulfonated azo dye in the production of which a 1.8 aminonaphthol is employed as a component.

7. Process of dyeing materials comprising cellulose acetate characterized in that said materials are colored by means of an unsulfonated azo dye in the production of which an aminonaphthol is employed as a component, diazotizing the dyestuff on the material and developing.

8. Process of dyeing materials comprising cellulose acetate characterized in that said materials are colored by means of an unsulfonated azo dye in the production of which an aminonaphthol is employed as a component and which contains the azo group in the ortho position to an auxochrome group of the naphthalene nucleus, diazotizing the dyestuff on the material and developing.

9. Process of dyeing materials comprising cellulose acetate characterized in that said materials are colored by means of an unsulfonated azo dye in the production of which a 1.8 aminonaphthol is employed as a component, diazotizing the dyestuff on the material and developing.

GEORGE HOLLAND ELLIS.
HENRY CHARLES OLPIN.
ERNEST WILLIAM KIRK.